J. E. HIBBERT.
BAND SAW MOVING MACHINE.
APPLICATION FILED DEC. 8, 1908.
932,987.
Patented Aug. 31, 1909.
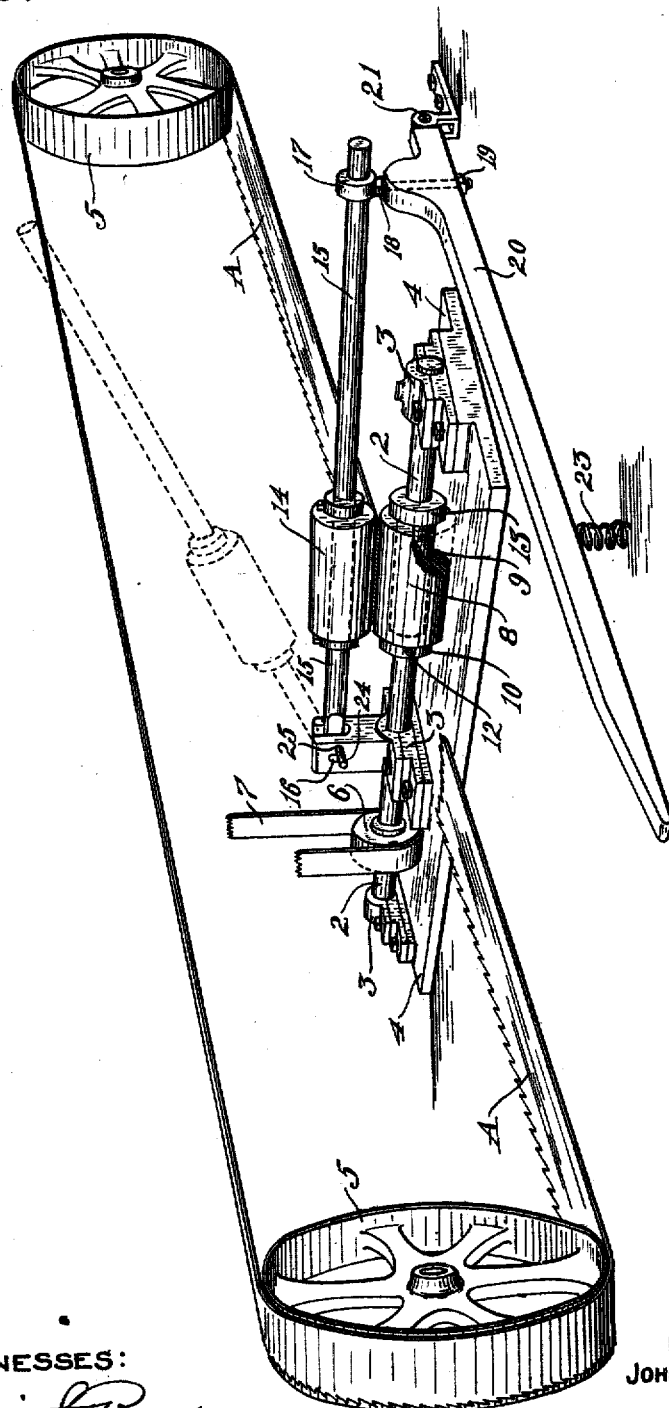
WITNESSES:
INVENTOR
JOHN E. HIBBERT.
BY
HIS ATTORNEY.

UNITED STATES PATENT OFFICE.

JOHN E. HIBBERT, OF STIRLING CITY, CALIFORNIA.

BAND-SAW-MOVING MACHINE.

932,987.     Specification of Letters Patent.     Patented Aug. 31, 1909.

Application filed December 8, 1908. Serial No. 466,438.

*To all whom it may concern:*

Be it known that I, JOHN E. HIBBERT, citizen of the United States, residing at Stirling City, in the county of Butte and State of California, have invented new and useful Improvements in Band-Saw-Moving Machines, of which the following is a specification.

This invention relates to a device for moving band saws.

The object of the invention is to provide a machine for moving a band saw on the roller or hammer bench while tensioning whereby the work which has heretofore been done by hand, may be done mechanically, and enable one to tension the band saw with very much less time than can be done by the means now in use. My machine will accommodate band saws ranging from 10 inches to 18 inches in width, and any length saw, and is constructed to accommodate any band saw roller bench in use.

It consists of the parts, the construction and combination of parts, or their equivalents, as will be set forth in the following specification and accompanying drawings, in which the figure is a perspective view, showing the application of the invention.

A represents the saw to be tensioned. In the mode of operation and construction, as embodied in a successfully operated machine, I provide a shaft 2 crosswise of and beneath the saw, which shaft is journaled in bearings 3, formed upon a suitable casting 4, which may be secured to the floor or bench upon which the band-saw is mounted. The saw travels around suitably spaced idle rollers 5.

Secured upon the shaft 2, and near one end, is a small pulley 6, driven constantly by a belt 7 from any desirable portion of the machinery, not here shown. A friction drive pulley 8 is also secured at any suitable point on the shaft; the saw being adapted to rest on this pulley with the teeth of the saw projecting beyond one end of the pulley.

Pulley 8 comprises in this instance a sleeve 9, having a shoulder 10, through which is a hole adapted to receive a screw 12 by which the sleeve 9 is locked on the shaft 2. The opposite end of the sleeve 10 is reduced and threaded to receive a nut 13. A tubular section of rubber or other suitable material is mounted upon the sleeve 9, and tightly held in place by the nut 13. Disposed parallel with and just above the pulley 8, so as to engage the band saw 5 is a counter friction roller 14, loosely carried between suitable collars on a lever 15 pivoted at 16 in the cap of one of the bearings 3.

The outer end of the lever 15 passes through a collar 17 which is connected to a threaded rod 18 adjustably secured by nuts 19 to an operating lever or treadle 20. The treadle is suitably pivoted at 21 to a bracket or the like, secured upon the floor or bench, in such a manner that the pivot 21 may be quickly removed and the treadle collar 21 slid off the lever 15. If the treadle is depressed, by the operator, the lever 15 carrying the roller 14 will be pulled downward, causing the band saw to be pressed into contact with the rapidly driven yielding friction pulley 8, thereby causing the band saw to traverse the bench at any desired speed. Manifestly the speed of the saw may be controlled to a nicety by varying the pressure upon the treadle 28. Any suitable means may be provided for maintaining the roller 14 normally out of contact with the saw; such being shown here as a spring 23 secured to the lower side of the treadle, and reacting against the floor or bench.

When it is desired to withdraw the band saw, for any reason from the device, the pivot 21 is taken out, the treadle removed from the lever 15 and the lever turned up about its pivot 16, when a pin 24 may be inserted through holes 25 in the bearing cap 3, just beneath the lever where it will remain as shown in the dotted lines.

While I have shown a collar 17 connecting the lever 15 to the treadle 20, it is obvious that any simple means may be substituted in lieu thereof, whereby the lever may be disconnected from the treadle without dismounting the treadle from its pivot.

Having thus described my invention, what I claim and desire to secure by Letters Patent is—

1. The combination in a band-saw moving apparatus, of a driven shaft, a sleeve fixed thereto, a friction pulley on said sleeve, a second shaft parallel with the first shaft having one end pivotally mounted, a roller loosely mounted on second shaft between which roller and said pulley the saw is adapted to pass, a lever at the free end of the second shaft having one end pivotally secured and the opposite portion serving as a treadle, said second shaft being connected to an intermediate portion of said lever.

2. The combination in a band-saw moving apparatus, of a driven shaft, a sleeve secured to said shaft having one end screw-threaded and having the opposite end provided with a shoulder, a pulley on said sleeve abutting against said shoulder, a nut adapted to engage the threaded end of the sleeve and to bear against the adjacent end of the pulley, a shaft parallel with the first shaft having one end pivotally secured, a roller loosely mounted on a second shaft and between which roller and said pulley the saw is adapted to pass, and a pivoted lever connected to the other end of a second shaft and affording means for moving said shaft to cause its roller to bear with a variable pressure against the saw.

In testimony whereof I have hereunto set my hand in presence of two subscribing witnesses.

JOHN E. HIBBERT.

Witnesses:
J. H. HIBBERT,
P. H. DUNBAR.